United States Patent [19]

Brown

[11] 4,032,259

[45] June 28, 1977

[54] METHOD AND APPARATUS FOR MEASURING FLUID FLOW IN SMALL BORE CONDUITS

[75] Inventor: Alvin E. Brown, Claremont, Calif.

[73] Assignee: E. I. Du Pont de Nemours and Company, Wilmington, Del.

[22] Filed: Jan. 8, 1976

[21] Appl. No.: 647,497

[52] U.S. Cl. .............................. 417/43; 73/194 A; 128/2.05 F

[51] Int. Cl.² ..................... F04B 49/00; G01F 1/66

[58] Field of Search .................... 73/194 A; 417/43

[56] References Cited
UNITED STATES PATENTS 2,770,795  11/1956  Peterson .................. 73/194 A UX
3,408,940  11/1968  McGrogan ..................... 417/43 X
3,787,882  1/1974   Fillmore et al. ................ 417/43 X
3,896,788  7/1975   Sato .................................. 73/194 A Primary Examiner—Richard C. Queisser
Assistant Examiner—John P. Beauchamp

[57] ABSTRACT

Fluid flow in small bore conduits is measured and controlled utilizing a Doppler flowmeter to measure flow rate. The fluid is then passed through a static chamber in which sound speed in the fluid is measured by a velocimeter. The outputs of the flowmeter and the velocimeter are multiplied to correct the measured flow rate for errors due to its sound speed dependency. The corrected flow rate may be then used to control a pump to provide the desired flow rate.

6 Claims, 1 Drawing Figure

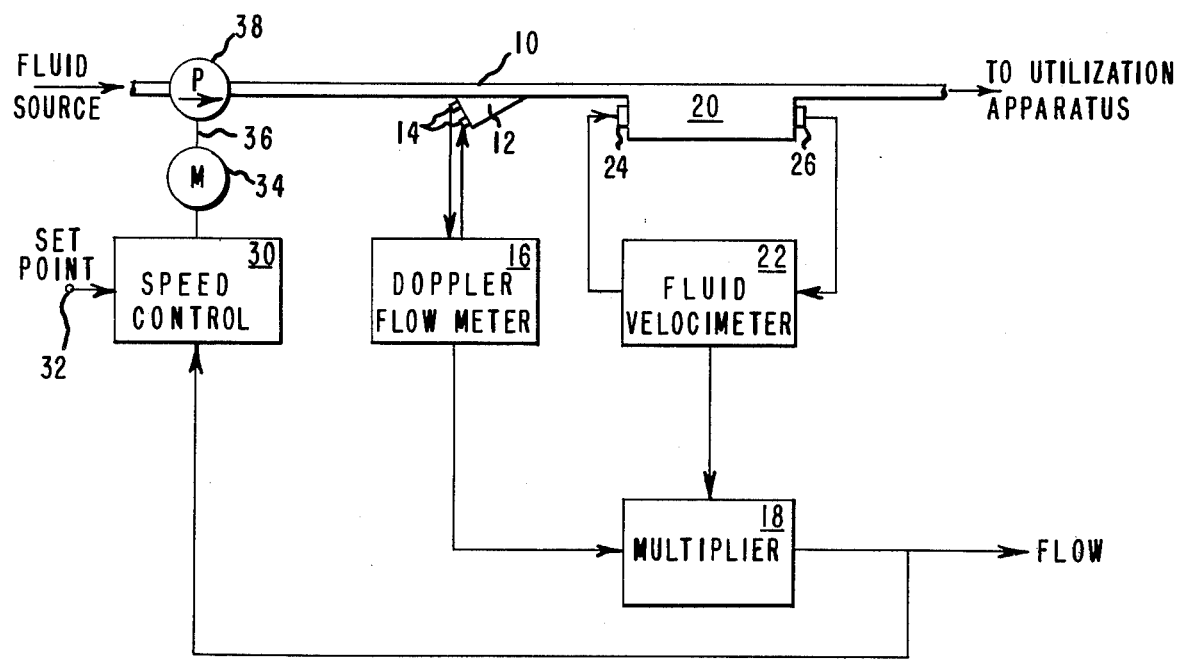

METHOD AND APPARATUS FOR MEASURING FLUID FLOW IN SMALL BORE CONDUITS

BACKGROUND OF THE INVENTION

This invention relates to ultrasonic fluid flowmeters and, more particularly, to a method and apparatus for measuring and controlling fluid flow in small diameter conduits utilizing ultrasonic techniques.

Many flowmeters have been developed in recent years for measuring both flow rate and sound speed within a fluid. A particular advance in this area was made with the advent of ultrasonic measuring techniques such as the so-called sing-around velocimeter developed at the Bureau of Standards in the 1950's. This velocimeter is described in an article by Greenspan et al. *Review of Scientific Instruments* 28, No. 11, November 1957. More recently, ultrasonic velocimeters and flowmeters utilizing phase-lock techniques have been developed for making sound speed and fluid flow measurements. Exemplary of such devices and methods are those described in U.S. Pat. No. 3,780,577 issued Dec. 25, 1973 to Alvin E. Brown. Many of these ultrasonic devices have been used in flow measurements of fluids including liquids as well as gases in pipelines and conduits. A particular problem, however, has arisen if the flow is to be measured is in a conduit having a small inside diameter or bore, such as those used in many instrumentation systems, e.g., liquid chromatographs. In such systems, the flowmeter transducers, whether operating in an axial mode or a radial mode relative to the conduit, cannot without extreme difficulty, if not impossibility, be placed in a meaningful position with respect to the conduits to permit accurate measurements. This is true not only because of the small diameter, but also because of the low flow rates typically encountered.

The so-called Doppler effect flowmeters offer a partial solution to this problem. The transducers of such flowmeters can be placed external to the conduits and, utilizing backscatter techniques, measure the flow rate within the conduit. Dopper flowmeters of this type are described, for example, in U.S. Pat. No. 3,896,788 issued July 29, 1975 to Yutaka Sato, and U.S. Pat. No. 3,575,050 issued Apr. 13, 1971 to Lawrence C. Lynnworth. Theoretically, such Doppler effect flowmeters can be placed external to the conduit, even one having a small diameter, and the flow therein measured. Unfortunately, however, flow measurements made using the Doppler effect are sound speed dependent. Hence in systems wherein the makeup of the fluid being measured is subject to change, such as particularly occurs in instrumentation type systems, the fluid measurements made are in error because of these variations in sound speed. Sound speed of a fluid, of course, varies as a function of fluid temperature, pressure and similar physical as well as chemical variables. The industry has therefore been left with the dilemma that it is difficult to make accurate flow measurements in small bore conduits utilizing ultrasonic techniques.

Accordingly, it is an object of this invention to provide a method of measuring fluid flow in small bore conduits.

Another object of this invention is to provide an improved apparatus for measuring fluid flow in small bore conduits.

A further object of this invention is to provide an improved method and apparatus for controlling the flow rate in small diameter conduits.

SUMMARY OF THE INVENTION

According to a preferred embodiment of the invention a meter for measuring fluid flow rate in a small bore conduit includes a Doppler effect flowmeter secured to the conduit for providing a flow output signal related to fluid flow rate in the conduit but which varies as a function of sound speed in the fluid, a static chamber having a flow cross-section significantly larger than the flow cross-section of said conduit connected in series with the conduit, a fluid velocimeter cooperating with the static chamber for providing a sound speed signal related to the speed of sound in the fluid, and multiplier means for multiplying the flow output signal by the sound speed signal to correct the flow rate signal for sound speed.

In a particularly preferred embodiment, a fluid pump is placed in series with the conduit. A flow rate set point signal is then compared in a flow controller with the set point and the resulting error signal used to control pump speed and hence flow rate in the conduit.

According to the method of this invention, the measurement of flow rate in a small bore conduit is made by measuring the Doppler effect backscatter on an ultrasonic signal introduced into the fluid of the conduit to obtain the fluid flow rate therein, measuring the sound speed of the fluid, and multiplying the sound speed by the fluid flow rate to correct the Doppler determined flow rate for sound speed.

BRIEF DESCRIPTION OF THE DRAWINGS

Further advantages and features of this invention will become apparent upon consideration of the following description wherein the sole FIGURE is a partial block and partial flow diagram of an apparatus, constructed in accordance with a preferred embodiment of this invention, for measuring and controlling fluid flow in small bore conduits.

DETAILED DESCRIPTION OF THE PREFERRED EMBODIMENT

While the method and apparatus of this invention have application in measuring and/or controlling fluid flow in pipes or conduits of virtually any size, they have particular applicability to conduits in the range of about 0.1 inch up to about 2 inches. Such a conduit 10 is depicted in the sole FIGURE. This conduit 10 may be constructed of any material, metal, plastic, or for that matter, living matter such as blood vessels. Fluid flow rate within the conduit is measured by mounting a conventional plastic shoe 12, adapted to match the exterior contour of the conduit 10 and to provide the necessary entrance and exit angles for ultrasonic waves generated and received by transmit-receive transducers 14 to and from the interior of the conduit. The transducers 14 may be any of the conventional ultrasonic transducers such as lead zirconate-lead titanate cemented or otherwise attached to the shoe. Other electrostrictive materials as well as magnetostrictive materials may be used. These transducers are electrically connected to receive energy from and transmit reflected energy to the electronic circuitry which comprise a Doppler effect flowmeter 16.

This flowmeter may be of any conventional type such as those described in said Sato and said Lynnworth patents. As is described in the Lynnworth patent, the so-called Doppler effect flowmeter utilizes backscatter from particles or discontinuities in the fluid. This backscatter is transmitted back at the same frequency as the emitted wave from the transducers 14. If these backscattering particles are in motion, the backscattered waves are shifted in frequency by an amount that depends upon the mean particle velocity in the scattering center. It is this change in frequency that is sensed by the Doppler flowmeter 16. The output of the flowmeter thus is a varying frequency signal which is applied to one input of a linear multiplier 18. The linear multiplier may be of a conventional type such as a digital rate multiplier available from Texas Instrument Company on TTL chips Ser. No. 74167 or Ser. No. 7497.

As is known, Doppler effect flowmeters are dependent upon the speed of sound in the fluid medium being sensed. Accordingly, the fluid flowing in the conduit 10 can cause errors in the Doppler flowmeter output as the fluid composition, temperature, pressure, etc., varies. Such variations can be wide-ranging, particularly in instrumentation systems such as liquid chromatographs, for example.

To correct this error, a static chamber 20 is placed in series with the conduit 10. This static chamber has an interior cross-section which is much greater than the internal cross-section of the conduit 10. The purpose of this is to provide a flow rate within this static chamber 20 which is much less than the flow rate of the fluid in the conduit so that the speed of sound within the fluid may be measured accurately. For this purpose a fluid velocimeter 22 of conventional design is utilized. This fluid velocimeter may for example have a transmitting ultrasonic transducer 24 placed on one end of the chamber and a receiving ultrasonic transducer 26 placed at the other end of the static chamber 20. This fluid velocimeter may be of a conventional type such as the sing-around variety. In a sing-around device, a sharp electrical discontinuity is applied to a piezoelectric or magnetostrictive transmitting element 24. This produces a dimensional change in the material, launching a compressional sonic wave which travels through the medium at the effective speed of sound and strikes an identical sound sensitive receiver element 26, a fixed distance L away. The effective speed of sound is the algebraic sum of the actual speed of sound in the medium, C, and the flow component, V, of the medium along the measured axis. The leading edge of the electrical signal produced by the receiving element is applied to a trigger generator to provide the sharp electrical continuity which initiates the next transmitted sound wave. By this technique as oscillator is obtained whose frequency is determined by the transit time of the sound wave through the measured medium. The resulting frequency, $f_1$ of the oscillator is $$f_1 = \frac{C + V}{L}.$$

If because of the utilization of a static chamber having a much larger diameter than the conduit 10, C>>V, then $f_1 \alpha$ C. Typically a chamber 3 cm. in diameter and 10 cm. long could be used with conduits having an internal diameter of 0.2 cm. for example.

Another type of velocimeter that might be used is the so-called phase-lock velocimeter described in U.S. Pat. No. 3,697,936 issued Oct. 10, 1972 to Ellis M. Zacharias. A phase-lock velocimeter is one in which the sound pulse transmitted through the fluid medium is received and the time of receipt phase detected with respect to the transmitted pulse. The phase-lock system adjusts the frequency of an oscillator so that the received signal is received at a predetermined point in time with respect to the transmitted signal. The frequency of the oscillator is hence a measure of the sound velocity in the fluid.

Whichever of the many known types of velocimeters is employed, the output from the velocimeter 22 is a frequency varying signal which is also coupled to the multiplier 18. The output of the multiplier is a varying frequency signal indicative of and proportional to fluid flow rate. This signal may be utilized directly for whatever measuring purposes desired or, in accordance with this invention, it may be coupled back to a speed control circuit to provide a closed loop flow control system. This speed control circuit 30 compares this frequency varying, flow related signal to an adjustable frequency set point signal that may be applied to the terminal 32. The comparison of these two signals, set point with actual flow rate, by the speed control circuit 30 results in an error signal which is used to drive a motor 34. Acting through a linkage 36 the motor 34 may drive a pump 38 in the conduit 10.

In this manner fluid from any suitable source is pumped through the conduit 10 at a rate controlled by the set point signal. Such system has particular application in instrumentation and other systems where flow must be controlled precisely. This control has been a particular problem in prior art systems wherein small bore conduits have been used.

By way of example, the velocimeters of the type useful with this invention may be purchased from various manufacturers such as Nusonics of Paramus, New Jersey or Ocean Research Equipment of Almouth, Massachusetts, to name but a few. Similarly, Doppler effect flowmeters may be purchased from Biotonex Lab, Silver Spring, Maryland or Medsonics, Mountain View, California.

In alternative systems, the output of the velocimeters which is a frequency related signal may be converted by conventional digital to analog convertors to an analog signal and the multiplication performed by analog circuitry. An analog linear multiplier that may be used for this purpose is one of the AD-530 series available from Analog Devices of Norwood, Massachusetts.

Utilizing any of the apparatus described, the method of this invention is seen to involve measuring of fluid flow rates in a small bore conduit by first measuring the Doppler effect backscatter on an ultrasonic signal introduced into the fluid of the conduit, thereby to obtain a signal representative of fluid flow rate in the conduit. Next, the sound speed in the fluid is measured and utilized to correct errors in the Doppler flow rate measurement. To correct these errors the sound speed is multiplied by the fluid flow rate. This signal may be used in a closed loop system to control flow rate through the conduit.

The apparatus and method of this invention are particularly unique in that they permit the utilization of relatively low cost components such as a Doppler flowmeter and a velocimeter to make relatively accurate measurements of fluid flow within small bore conduits. The actual size of the static chamber 20 is dependent upon the frequency of the velocimeter and the required resolution of the sound speed measurement. Since the Doppler frequency is a linear function of sound speed, relatively large errors, say an error of 10% due to a 10% change in sound speed, can readily be reduced to a 1% error by a measurement of sound speed that is accurate only within 10%.

I claim:

1. A meter for measuring fluid flow rate in a small bore conduit comprising, in combination,
    a Doppler effect flowmeter secured to said conduit for providing a flow signal related to fluid flow rate in said conduit but which varies as a function of sound speed in said fluid,
    a static chamber, having a flow cross-section significantly larger than the flow cross-section of said conduit, connected in series with said conduit,
    a fluid velocimeter cooperating with said static chamber for generating a sound speed signal related to the speed of sound in said fluid,
    and multiplier means for multiplying said flow signal by said sound speed signal to correct said flow signal for sound speed.

2. A meter according to claim 1 wherein said static chamber flow cross-section is sufficiently larger than said conduit cross-section that fluid flow rate approaches zero in said chamber.

3. A meter according to claim 1 wherein said flow output signal varies in frequency in accordance with said flow rate, said sound speed output signal varies in frequency in accordance with said sound speed, and said multiplier is a linear scaler.

4. A meter according to claim 3 which also includes a fluid pump in series with said conduit,
    a source of a flow rate set point signal,
    a speed controller for controlling said pump speed in accordance with the deviation of said corrected flow signal from said set point signal, thereby control said flow rate in said conduit.

5. A meter according to claim 1 which also includes a fluid pump in series with said conduit,
    a source of a flow rate set point signal,
    a speed controller for controlling said pump speed in accordance with the deviation of said corrected flow signal from said set point signal, thereby control said flow rate in said conduit.

6. A method of measuring fluid flow rate in a small bore conduit including the steps of:
    measuring the Doppler effect backscatter on an ultrasonic signal introduced into the fluid of said conduit to obtain fluid flow rate in said conduit,
    measuring the sound speed in said fluid in an environment where said flow rate is reduced to a rate much less than in said conduit, and
    multiplying said sound speed by said fluid flow rate in said conduit to correct said Doppler flow rate for sound speed.

* * * * *